(12) United States Patent
Rozenboim

(10) Patent No.: US 8,653,689 B2
(45) Date of Patent: Feb. 18, 2014

(54) METHOD AND SYSTEM FOR CURRENT-MODE POWER LINE COMMUNICATIONS

(75) Inventor: Leonid Rozenboim, Los Gatos, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 776 days.

(21) Appl. No.: 12/467,117

(22) Filed: May 15, 2009
(Under 37 CFR 1.47)

(65) Prior Publication Data

US 2010/0118985 A1    May 13, 2010

Related U.S. Application Data

(60) Provisional application No. 61/198,991, filed on Nov. 12, 2008.

(51) Int. Cl.
*H02J 1/00* (2006.01)
(52) U.S. Cl.
USPC ............................................................ 307/4
(58) Field of Classification Search
USPC ....................................................... 307/2, 4
See application file for complete search history.

(56) References Cited

U.S. PATENT DOCUMENTS

| | | | |
|---|---|---|---|
| 4,526,553 A * | 7/1985 | Guerrero | 446/380 |
| 5,235,266 A | 8/1993 | Schaffrin | |
| 5,268,832 A | 12/1993 | Kandatsu | |
| 5,604,430 A | 2/1997 | Decker et al. | |
| 5,923,158 A | 7/1999 | Kurokami et al. | |
| 6,081,104 A * | 6/2000 | Kern | 323/268 |
| 6,262,558 B1 | 7/2001 | Weinberh | |
| 6,275,016 B1 | 8/2001 | Ivanov | |
| 6,433,522 B1 * | 8/2002 | Siri | 323/272 |
| 6,448,489 B2 | 9/2002 | Kimura et al. | |
| 6,650,031 B1 | 11/2003 | Goldack | |
| 6,844,739 B2 | 1/2005 | Kasai et al. | |
| 6,894,911 B2 | 5/2005 | Telefus et al. | |
| 6,984,970 B2 | 1/2006 | Capel | |
| 7,061,214 B2 | 6/2006 | Mayega | |
| 7,248,946 B2 | 7/2007 | Bashaw et al. | |
| 7,256,566 B2 | 8/2007 | Bhavaraju et al. | |
| 7,276,886 B2 | 10/2007 | Kinder | |
| 7,356,048 B1 | 4/2008 | Rezvani | |

(Continued)

FOREIGN PATENT DOCUMENTS

| | | |
|---|---|---|
| AU | 2005262278 | 7/2005 |
| DE | 4232356 | 3/1994 |

(Continued)

OTHER PUBLICATIONS

WO_2006005125_A1_I to Wolfs, Jan. 19, 2006.*

(Continued)

*Primary Examiner* — Daniel Cavallari
(74) *Attorney, Agent, or Firm* — Greenberg Traurig LLP

(57) ABSTRACT

An apparatus and method includes a solar panel. A power bus is coupled to the solar panel, and supports transmission of AC communication signals. The power bus includes a high current power wire. A current transformer is coupled to the power bus adjacent the solar panel. A capacitor, coupled to the power bus, is connected in parallel with the solar panel, and connected between the solar panel and the current transformer.

20 Claims, 7 Drawing Sheets

(56) References Cited

U.S. PATENT DOCUMENTS

| | | | |
|---|---|---|---|
| 7,518,346 | B2 | 4/2009 | Prexl |
| 7,595,616 | B2 | 9/2009 | Prexl |
| 7,605,498 | B2 | 10/2009 | Ledenev et al. |
| 7,719,140 | B2 | 5/2010 | Ledenev et al. |
| 7,797,367 | B1 | 9/2010 | Gelvin et al. |
| 2002/0002040 | A1* | 1/2002 | Kline et al. ............. 455/402 |
| 2004/0258141 | A1* | 12/2004 | Tustison et al. .......... 375/219 |
| 2005/0057214 | A1 | 3/2005 | Matan |
| 2005/0057215 | A1 | 3/2005 | Matan |
| 2006/0001406 | A1 | 1/2006 | Matan |
| 2006/0162772 | A1 | 7/2006 | Presher et al. |
| 2006/0174939 | A1 | 8/2006 | Matan |
| 2006/0185727 | A1 | 8/2006 | Matan |
| 2007/0152628 | A1* | 7/2007 | Lee ...................... 320/107 |
| 2007/0273351 | A1 | 11/2007 | Matan |
| 2008/0084937 | A1* | 4/2008 | Barthold et al. ........ 375/257 |
| 2008/0106241 | A1* | 5/2008 | Deaver et al. ........... 323/209 |
| 2008/0121272 | A1 | 5/2008 | Besser et al. |
| 2008/0122449 | A1 | 5/2008 | Besser et al. |
| 2008/0122518 | A1 | 5/2008 | Besser et al. |
| 2008/0147335 | A1* | 6/2008 | Adest et al. ............ 702/64 |
| 2008/0179949 | A1 | 7/2008 | Besser et al. |
| 2008/0191560 | A1 | 8/2008 | Besser et al. |
| 2008/0191675 | A1 | 8/2008 | Besser et al. |
| 2008/0303503 | A1 | 12/2008 | Wolfs |
| 2009/0000654 | A1* | 1/2009 | Rotzoll et al. ........... 136/244 |
| 2009/0160258 | A1* | 6/2009 | Allen et al. ............. 307/82 |
| 2009/0284240 | A1* | 11/2009 | Zhang et al. ............ 323/285 |
| 2010/0117858 | A1 | 5/2010 | Rozenboim |

FOREIGN PATENT DOCUMENTS

| | | |
|---|---|---|
| DE | 19961705 | 7/2001 |
| EP | 1388774 | 2/2004 |
| ES | 2249147 | 3/2006 |
| WO | 03012569 | 2/2003 |

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Roman, Eduardo, et al., "Intelligent PV Module for Grid-Connectred PV Systems," IEEE Transactions on Industrial Electronics, vol. 53, No. 4, pp. 1066-1073, Aug. 2006.

Walker, Jeffrey R. et al., "Cascaded DC-DC Converter Connection of Photovoltaic Modules," IEEE Transactions on Power Electronics, vol. 19, No. 4, pp. 1130-1139, Jul. 2004.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application PCT/US08/75127, International Search Report and Written Opinion (mailed Apr. 28, 2009).

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

ABB France, "AC500—Your PLC for Solar Systems: Change for More Efficient Energy," product brochure, Jul. 2009.

Danfoss Solar Inverters A/S, "Concept Paper: String Inverters for PV Power Plants," May 2009.

Jacobsen, K.S., "Synchronized Discrete Multi-Tone (SDMT) Modulation for Cable Modems: Making the Most of the Scarce Reverse Channel Bandwidth," Conference Proceedings of Wescon/97, pp. 374-380, Nov. 4, 1997.

Loyola, L. et al., "A Multi-Channel Infrastructure based on DCF Access Mechanism for Wireless LAN Mesh Networks Compliant with IEEE 802.11," 2005 Asia-Pacific Conference on Communications, pp. 497-501, Oct. 5, 2005.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Storfer, Lior, "Enhancing Cable Modem TCP Performance," Texas Instruments Inc. white paper, Jul. 2003.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Wikimedia Foundation, Inc., "Power Line Communication," located at http://en.wikipedia.org/wiki/Power_line_communication, Mar. 7, 2010.

\* cited by examiner

METHOD AND SYSTEM FOR CURRENT-MODE POWER LINE COMMUNICATIONS

RELATED APPLICATIONS

The present application claims priority to U.S. Provisional Application Ser. No. 61/198,991, filed Nov. 12, 2008, entitled "Current-Mode Power Line Communications," which is assigned to the assignee hereof and hereby expressly incorporated by reference.

FIELD OF THE INVENTION

The present invention relates generally to the field of communications and, more particularly, to power line communications.

BACKGROUND

Many of the issues involved in sending communication signals over DC power lines are similar to sending such signals over the AC power grid. For example, the properties of the transmission medium can vary greatly. As another example, the amount and nature of noise sources are very difficult to predict.

However, there are some important differences too. While on the AC power grid, loads are mostly of an inductive nature, and some loads may be resistive and a few subtly capacitive. On a DC power bus, virtually all loads and sources are capacitive in nature. Another key difference lies in the use of transformers to convert between different voltage levels on an AC power grid that cannot be similarly employed on a DC bus. Hence, a majority of sources and loads on a DC bus employ electronic DC-DC converters, which are very strong noise emitters.

SUMMARY

In one of many embodiments, an apparatus and method of the present invention includes a solar panel. A power bus is coupled to the solar panel, and supports transmission of AC communication signals. The power bus includes a high current power wire. A current transformer is coupled to the power bus adjacent the solar panel. A capacitor, coupled to the power bus, is connected in parallel with the solar panel, and connected between the solar panel and the current transformer.

In one of many embodiments, the power bus is a DC power line.

In one of many embodiments, the current transformer includes the high current wire line as a primary winding and a Rogowski coil as a secondary winding.

In one of many embodiments, the current transformer has a winding ratio between 1:50 and 1:200 approximately.

In one of many embodiments, an adapter communicatively coupled to the current transformer.

In one of many embodiments, the adapter includes a modem.

In one of many embodiments, the adapter is configured to receive and transmit information from sensors, the information relating to measurements of photovoltaic cell characteristics.

In one of many embodiments, the power bus is a low frequency AC power line.

Other embodiments and features of the present invention will be apparent from the accompanying drawings and from the detailed description which follows.

BRIEF DESCRIPTION OF THE DRAWINGS

The present disclosure is illustrated by way of example and not limitation in the figures of the accompanying drawings in which like references indicate similar elements.

DESCRIPTION OF THE EMBODIMENT

Figure 1:
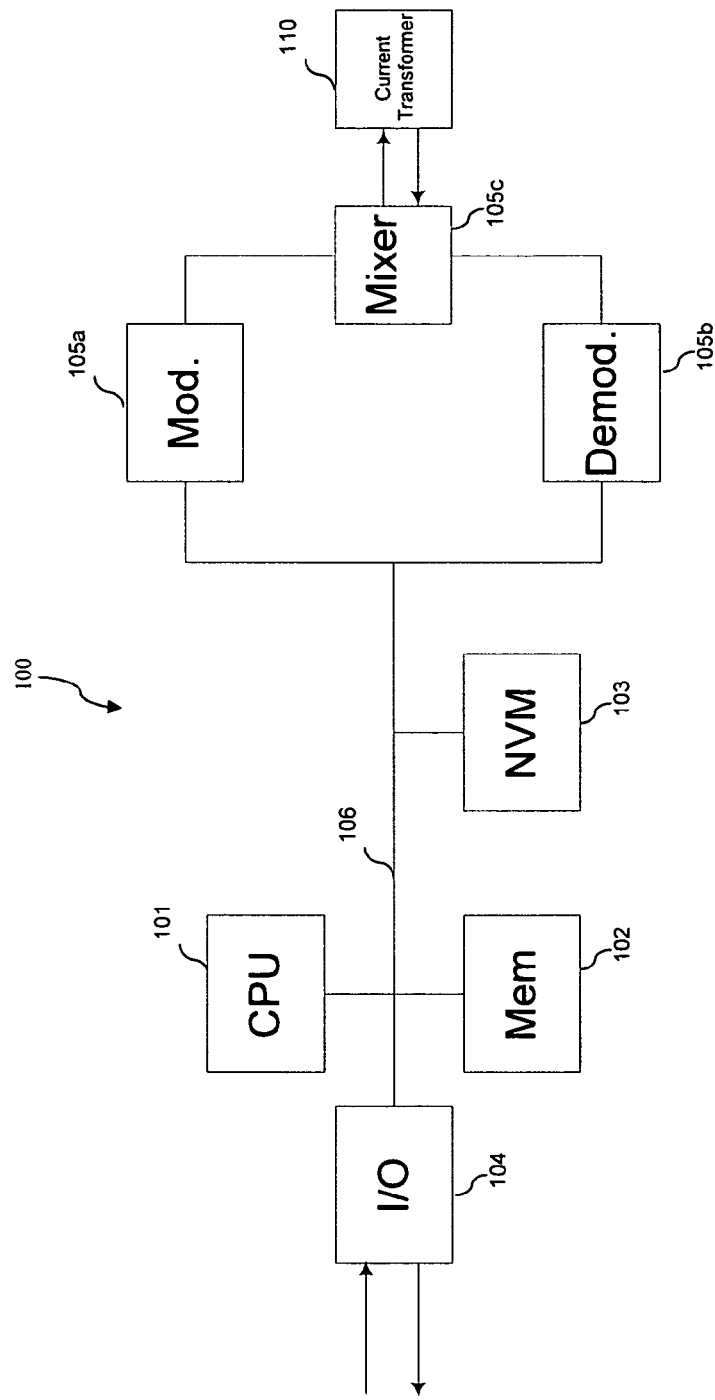
FIG. 1 illustrates an exemplary adapter for coupling with a current transformer in a communication system in accordance with one embodiment of the present invention.

In the following description, for purposes of explanation, numerous specific details are set forth in order to provide a thorough understanding of the description. It will be apparent, however, to one skilled in the art that embodiments of the disclosure can be practiced without these specific details. In some instances, structures and devices are shown in block diagram form in order to avoid obscuring the description. In other instances, functional block diagrams are shown to represent data and logic flows.

Reference in this specification to "one embodiment," "an embodiment," "other embodiments" or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments.

Moreover, whether or not there is express reference to an "embodiment" or the like, various features are described which may be exhibited by some embodiments and not by others. Similarly, various requirements are described which may be requirements for some embodiments but not other embodiments.

The methods and systems of the present invention relate to transmission of AC communications signals over DC power lines. The method and system of the present invention is an advancement over conventional practices of providing communications over AC power lines, both at the residential level for home automation as well as at the distribution level by a utility company. The addition of telecommunications signals over DC power lines in accordance with the method and system of the present invention has many applications, including narrow-band audio distribution, automatic meter reading, system diagnostics, and more.

An exemplary embodiment of the present invention is designed for the use of electrical power wires of a solar panel installation for the purpose of monitoring the performance of the individual solar panels and collection of their performance data at a centralized station. However, the present invention can have a variety of additional applications, including but not limited to any direct current power distribution system. In one embodiment, the present invention can be used in applications wherein the communication frequencies used do not create an antenna effect, i.e., ⅛ (one-eighth) wave length of the communications signal does not exceed the dimensions of the power distribution lines.

As stated above, there are important distinctions between the transmission of communication signals over DC power lines versus the AC power grid. While on the AC power grid, most loads are inductive in nature. Other loads may be resistive and while still others may be capacitive. On a DC power bus, almost all loads and sources are capacitive in nature. Another key difference lies in the use of transformers to convert between different voltage levels on an AC power grid that cannot be similarly employed on a DC bus. Hence a majority of sources and loads on a DC bus employ electronic DC-DC converters, which characteristically can be very strong noise emitters.

In certain circumstances, the capacitive nature of DC loads and sources can be mitigated to some degree using series inductive filters. Such use of inductors as filters would attenuate AC noise as well, in turn allowing the conventional use of voltage mode AC communication signals over a fairly known impedance range for communications. However, these inductors may be physically large due to the need for them to sustain high currents while being connected in series to the DC power bus. The relative high expense of such a technique can rival or far exceed the costs of running separate, dedicated wires for communications, another undesirable technique.

Instead of "fighting" or otherwise attempting to remediate the capacitive nature of the DC bus and hence its related tendency to exhibit very low impedance to AC communications signals, the present invention innovatively leverages those qualities of the DC bus to advantage. In this regard, it is assumed that all loads are capacitive in nature and thus the transmission line impedance is very low, namely lower than 2Ω. Thus, the communications signal is carried over the DC bus in the form of AC current. In this manner, the loads appear as "short circuits" to the AC communications signal, and do not attenuate the signal significantly when connected in series.

Appropriate measures can be employed to achieve low impedance of loads and sources. Whenever a load or source has impedance that is too high, the problem can be mitigated by connecting a capacitor in parallel to the load or source. Also, if a load generates an undue amount of noise, a capacitor added directly on the terminals connecting that load to the DC bus can dissipate most of the noise. In certain extreme cases, a ferrite filter may be used on one of the wires. The addition of a ferrite filter in this manner can avoid the need for a capacitor that is excessively large.

It will be appreciated that care should be exercised to avoid several DC loads or sources being connected in parallel too closely to one another. Such a connection would undesirably create natural inductance from the loads. The resulting inductance would attenuate the AC signal to an undue degree.

In accordance with one embodiment of the present invention, a current transformer is employed to convert a current mode AC signal, which carries communications signals, to and from a conventional voltage mode. The use of a current transformer allows the communications signal to be generated and received using existing electronic components. The current transformer, a low cost device often used to measure AC current on power lines, has a wider bandwidth so that the current transformer itself does not dissipate the AC communications signal.

In one embodiment of the present invention, the current transformer includes a Rogowski coil. The Rogowski coil is a toroidal coil having an air core. The Rogowski coil serves as a secondary winding for the current transformer, with the primary winding being the power wire threaded through the center of the toroid. The current transformer serves to match transceiver impedance with transmission line impedance. The transceiver impedance is typically in the 50 to 100 ohm range, while the transmission line impedance is in the 0.25 to 0.75 ohm range. In one embodiment, the current transformer has a winding ratio in the range of 1:50 to 1:200, where the high-current power wire serves as the single winding of the primary coil of the transformer.

FIG. 1 shows an overview of an exemplary adapter 100 that can drive or listen to Rogowskis coil to form a communication system in accordance with one embodiment of the present invention. The adapter 100 includes CPU 101, random access memory (MEM)102, non volatile memory (NVM) 103, input/output (I/O) system 104, modulator 105a, demodulator 105b, mixer 105c, and bus 106. A coupling current transformer 110, which is described in more detail below, is coupled to the adapter 100 and to a DC power bus, as discussed in more detail below. In one embodiment, an embedded processor can be used to combine many elements of the adapter 100. The CPU 101 can be a digital signal processor (DSP), or both a CPU and DSP. The CPU 101 is connected to the bus 106, which can contain a power distribution to supply power to, for example, the non volatile memory (NVM) 103, random access memory (RAM) MEM 102, and the input/output (I/O) system 104. The bus 106 communicates with the mixer 105c through the modulator 105a and the demodulator 105b. In one embodiment, the mixer 105c can be a multiplexer or two band pass filters. Together, the modulator 105a and demodulator 105b can constitute a modem.

In one embodiment, the modulator 105a and the demodulator 105b can include analog components, with the rest of the modem implemented in software and stored together with other programs in the non volatile memory (NVM) 103. In one embodiment, the input/output (I/O) system 104 can connect directly to sensors. In one embodiment, control functions may also reside in non volatile memory (NVM) 103 or inside the CPU 101 in the form of analog-to-digital converters to, for example, measure the photovoltaic cell voltage, current, temperature, etc. In one embodiment, the input/output (I/O) system 104 may be used to communicate with, for example, other controllers. The CPU 101, together with the random access memory (RAM) MEM 102 and the non volatile memory (NVM) 103, also can concurrently control a voltage or current conversion to optimize performance of solar panels.

Figure 2:
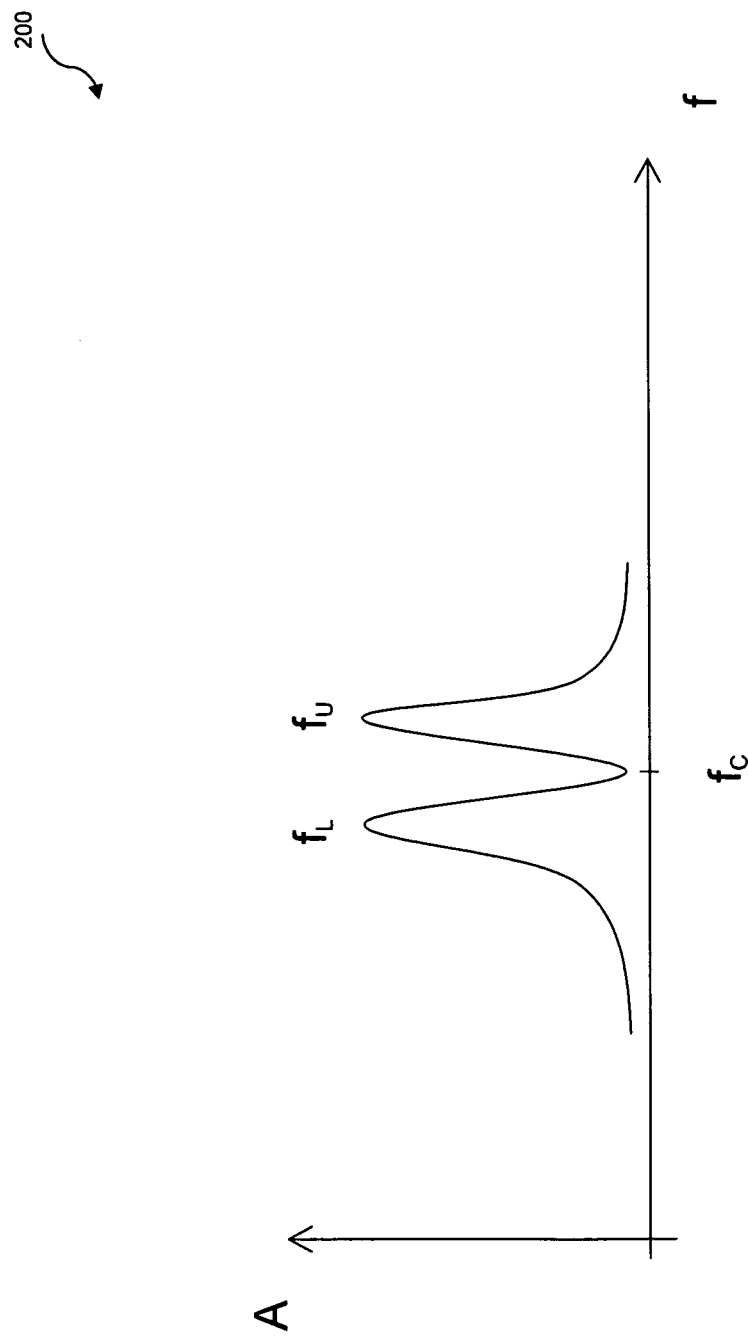
FIG. 2 illustrates an exemplary hull curve of a frequency modulation (FM) communications carrier in accordance with one embodiment of the present invention.

FIG. 2 shows an exemplary hull curve of a frequency modulation (FM) communications signal 200 in accordance with one embodiment of the present invention. The hull curve of the communications signal 200 is shown on a graph where the x-axis represents frequency and the y-axis represents amplitude. The communications signal is carried over the DC power lines with a center frequency $f_c$, $f_l$ and $f_u$ appear as peaks around center frequency $f_c$. In one embodiment, single side band modulation (SSB) or dual side band modulation (DSB) can be used.

Figure 3:
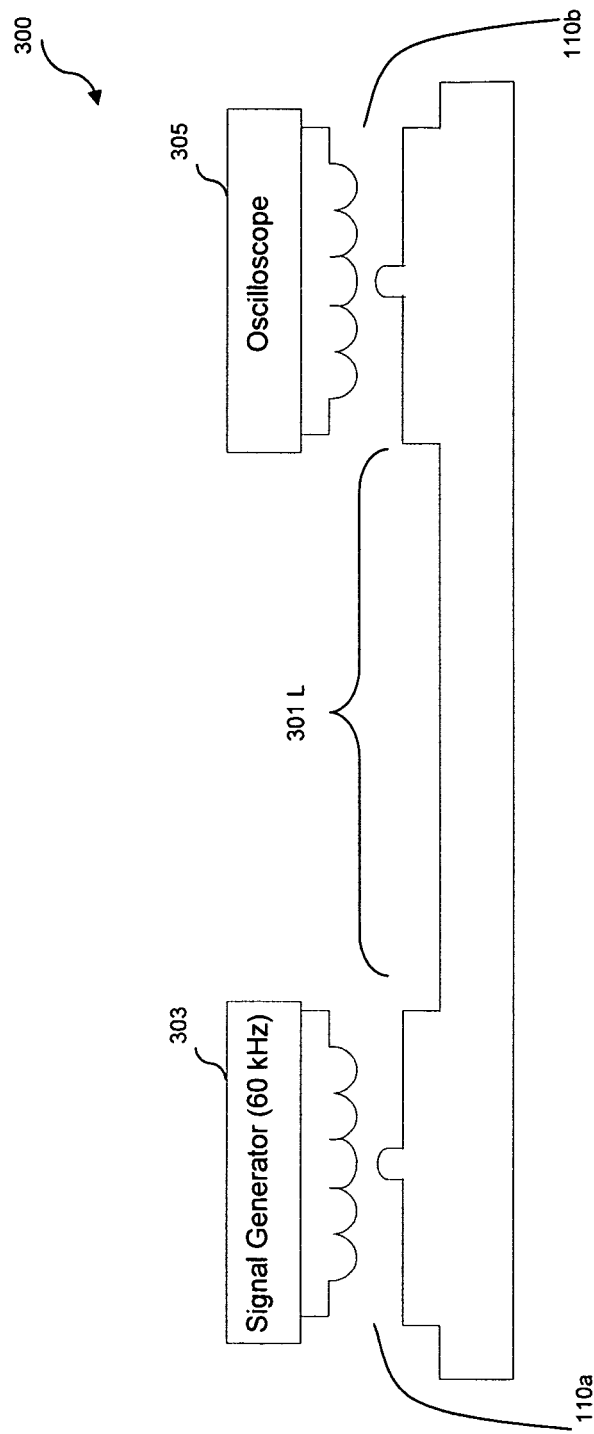
FIG. 3 illustrates an exemplary circuit in accordance with one embodiment of the present invention.

FIG. 3 is a simplified electrical diagram showing an exemplary circuit 300 including a pair of coupling current transformers 110a and 110b. The coupling current transformers are implemented to include Rogowski coils in accordance with one embodiment of the present invention. The coupling current transformers 110a, 110b have equal winding ratios. The current transformers 110a, 110b are connected to one another by a simple current loop wiring 301 having a length L. If the current loop wiring 301 is relatively short, i.e., the length L is approximately a few inches, the impedance of the current loop wiring 301 will approach zero. In this regard, the current transformers 110a, 110b and impedance mismatch between each of their secondary windings and, respectively, an electronic signal source 303 and an electronic signal receiver 305 are the only expected causes of loss in the exemplary circuit 300. In one embodiment, the electronic signal source 303 is a signal generator operating at 60 kHz. In one embodiment, the electronic signal receiver 305 is an oscilloscope.

If the length L of the current loop wiring 301 increases, the impedance of the current loop wiring 301 will increase due to the inherent inductance that is proportional to the length of a straight wire. The increased inductance will attenuate the signal to some degree. However, as will be appreciated by those having ordinary skill in the art, the length L can be limited to approximately one-eighth of the wavelength of the AC communications signal. Such a limitation is intended to avoid antenna effects and associated signal losses and radiation in view of the relative thickness of the power line as a transmission medium for high energy levels.

The impedance generated by the exemplary circuit 300 and thus the resulting attenuation are very small. Empirical results show that a length L equal to approximately 1 foot causes a loss of approximately 25% of the signal strength, which would represent the loss of the current transformers 110a, 110b. A length L equal to approximately 100 feet results in approximately 50% (3 db) attenuation of the signal strength. Neither the power line nor the coupling current transformers are expected to cause any significant attenuation.

Figure 4:
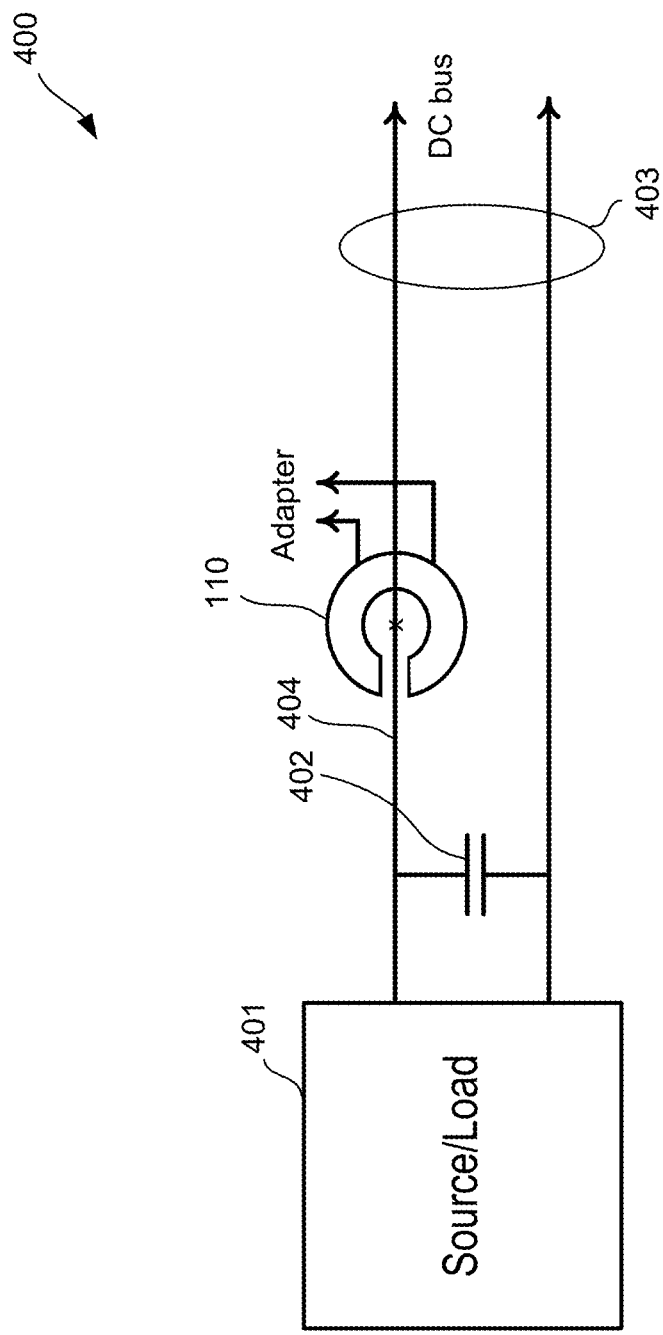
FIG. 4 illustrates an exemplary circuit including a load or source in accordance with one embodiment of the present invention.

FIG. 4 shows exemplary circuit 400 with relatively significant attenuation. The circuit 400 includes a load or source of power 401, a capacitor 402, a DC bus 403, and a coupling current transformer 110 around a high current power wire 404 of the DC bus 403. The more significant signal attenuation in circuit 400 is caused by the load or source 401 connected in parallel to the DC bus 403, which serves as a current loop wiring. As discussed above, the desire to reduce the impedance of a current loop wiring, including any load or source, can be achieved by connecting the capacitor 402 in parallel to the load or source 401 as close as possible to its connection to the current loop wiring, i.e., the DC bus 403, but just before the location of the coupling current transformer 110. In this way, for the AC communications signal, the current loop maintains its low impedance. In one embodiment, the current transformer 110 can be connected to an adapter like the kind discussed above in connection with FIG. 1.

The low impedance of the current loop wiring, i.e., the DC bus 403, is fairly immune to electromagnetic fields in the environment surrounding the circuit 400. Any voltage induced onto the wire by external electric or magnetic fields is readily dissipated by the low impedance of the wire. Also, since the wire length is kept relatively short to avoid antenna effects, the impact of external electromagnetic fields is very small.

External electromagnetic fields can induce voltage onto the toroidal secondary windings of the coupling current transformer 110. It is therefore important that the toroidal secondary windings be spread as evenly as possible in accordance with Rogowski coil principles to practically eliminate the influence of external fields on the coupling current transformer 110.

It will be appreciated that the most significant noise sources can be the energy sources and loads present on the DC bus. Such energy sources and loads typically can contain electronic switching voltage converters operating in frequencies that are near the AC communications signal carrier and generate very strong harmonics. For this reason, a bypass parallel capacitor 402 can be connected to such noisy energy sources and loads just behind the coupling transformer. In one embodiment, an inductive filter (not shown) can be connected in series with the parallel capacitor to address energy sources and loads with extremely high noise levels.

Problems may arise with scale. Increased scale would lead to a large number of parallel branches that may cause attenuation to a degree that cannot be addressed by simply adding series inductors to each of the parallel branches. In extreme cases, the cable length may exceed what is possible with a given carrier frequency and result in electromagnetic emissions and increase noise susceptibility.

Figure 5:
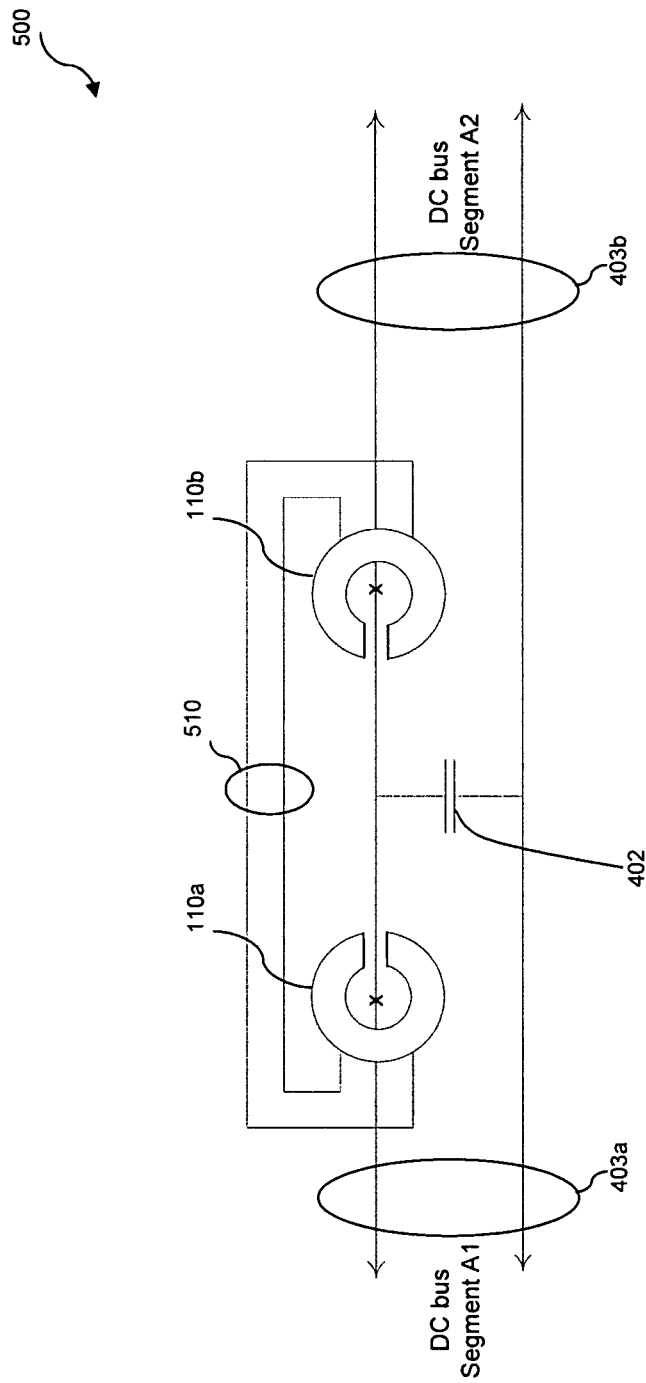
FIG. 5 illustrates an exemplary circuit including a segmented DC bus in accordance with one embodiment of the present invention.

FIG. 5 shows an exemplary circuit 500 that addresses this concern by separating the DC bus 403 into independent segments 403a and 403b. This is accomplished by adding a large parallel, separating capacitor 402 at a certain predetermined DC bus location. In one embodiment, the impedance of the capacitor 402 is similar to the overall impedance of the DC bus 403, typically less than or equal to 1 ohm. The predetermined bus location is based on various considerations with the desire to keep the length of each segment below $\lambda/4$, where $\lambda$ is the wavelength of the lowest carrier frequency used in signaling. Such length prevents the wires from becoming powerfully radiating antennae. Several segments may be required on long buses. A pair of current transformers 110a and 110b are coupled with the DC bus 403 with their secondary windings interconnected on the two sides of the separating capacitor 402 via separate link 510. The separate link 510 provides a separate path for the AC communications signal. In one embodiment, one or more active amplifiers (not shown) may be added in the separate link 510 (uni-directional or bi-directional) to amplify weak signals in systems with very long wiring. The amplifiers can be made as clamp-on units that do not require a splicing of cables by having spikes that tap the wires and cores that open for mounting.

Figure 6:
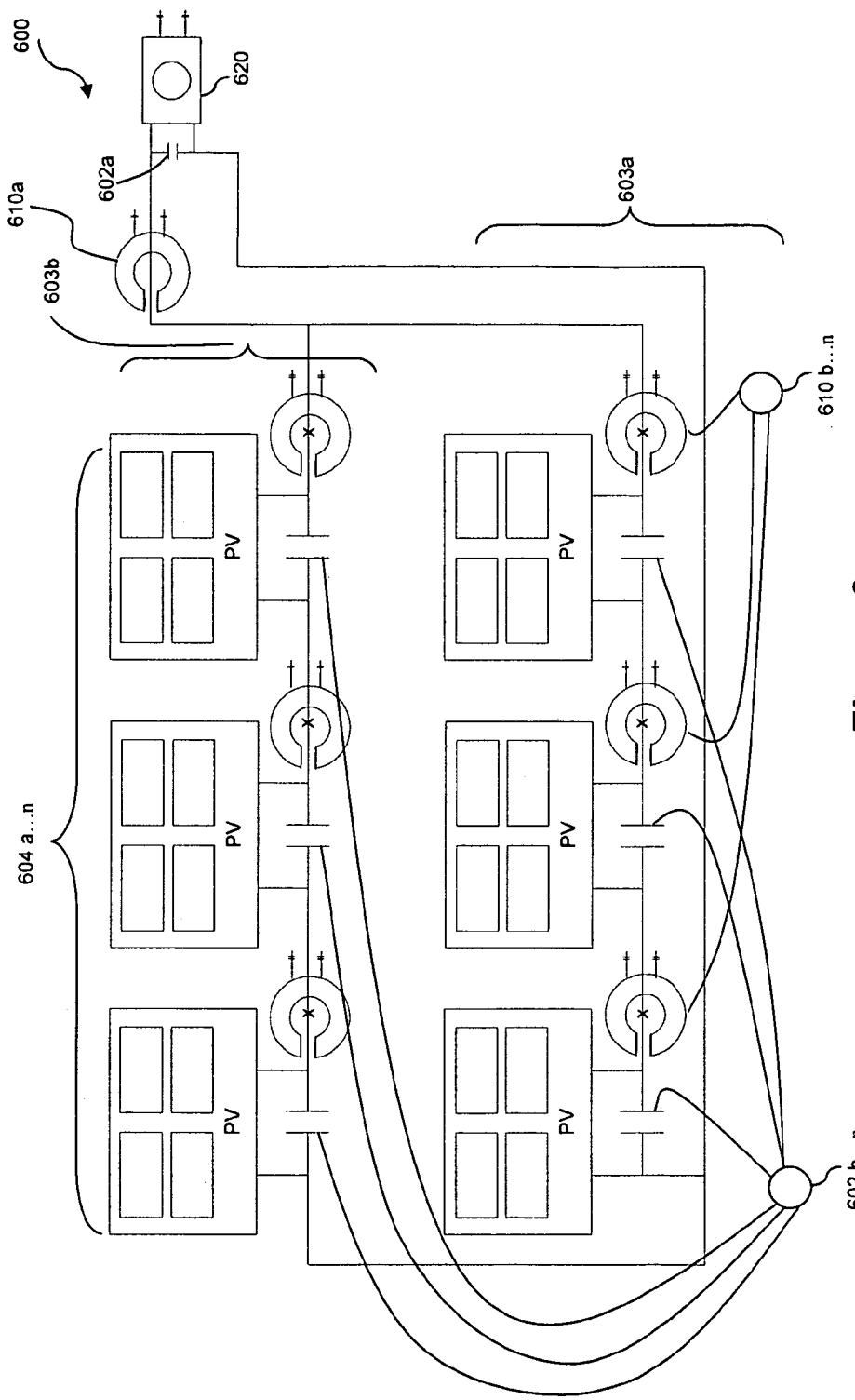
FIG. 6 illustrates a schematic representation of an exemplary energy generation system in accordance with one embodiment of the present invention.

FIG. 6 is a schematic diagram of an energy generation system 600 including an exemplary typical photovoltaic (PV), or solar cell, array 604a-n. Three solar panels in the photovoltaic array 604a-n are shown in a series configuration 603a, and three solar panels in the photovoltaic array 604a-n are shown in a series configuration 603b. The series configuration 603a is connected in parallel with the series configuration 603b. The number of solar panels can of course vary.

The photovoltaic array 604a-n is connected to an inverter 620, which is connected to a capacitor 602a and a current coupling transformer 610a. The capacitor 602a and the current coupling transformer 610a function in the manner described above in connection with, for example, the capacitor 402 and the current coupling transformer 110. The inverter 620 takes power from the DC bus and delivers AC power.

Each of the panels in the photovoltaic array 604a-n is connected to a corresponding capacitor 602b-n and a corresponding current coupling transformer 610b-n. The current coupling transformer 610b-n can be connected to a corresponding adapter (not shown) like the kind discussed above in connection with FIG. 1. Each panel with capacitor 602b-n, current coupling transformer 610b-n, and adapter functions in the manner described above in connection with, for example, the capacitor 402, the current coupling transformer 110, and the adapter 100. Each of the coupling current transformers 610b-n can be connected to an appropriate adapter, sending and receiving voltage mode AC communication signals carrying digital information. As discussed above, the capacitors 602b-n serve as AC bypass capacitors that are located near each panel (or source/load) in the photovoltaic array 604a-n and located just before the current coupling transformer 610b-n. In one embodiment, the capacitors in controllers (or local management units or other DC to DC converters) are large enough to obviate the addition of capacitors 602b-n.

In one embodiment, ferrite filters (not shown) can be coupled, or snapped, onto the DC bus (i.e., power wires) to add inductance. In one embodiment, a ferrite filter can be connected to each series branch of panels in the photovoltaic array 604a-n for impedance control. In one embodiment, a ferrite filter can be connected on the wire between the inverter 620 and its bypass capacitor 602a to even better address the switching noise induced by the inverter 620. In one embodiment, a pair of current transformers with their secondary windings interconnected on the two sides of a separating capacitor via a separate link are coupled to the DC bus at certain intervals, as discussed above in connection with FIG. 5.

Figure 6A:
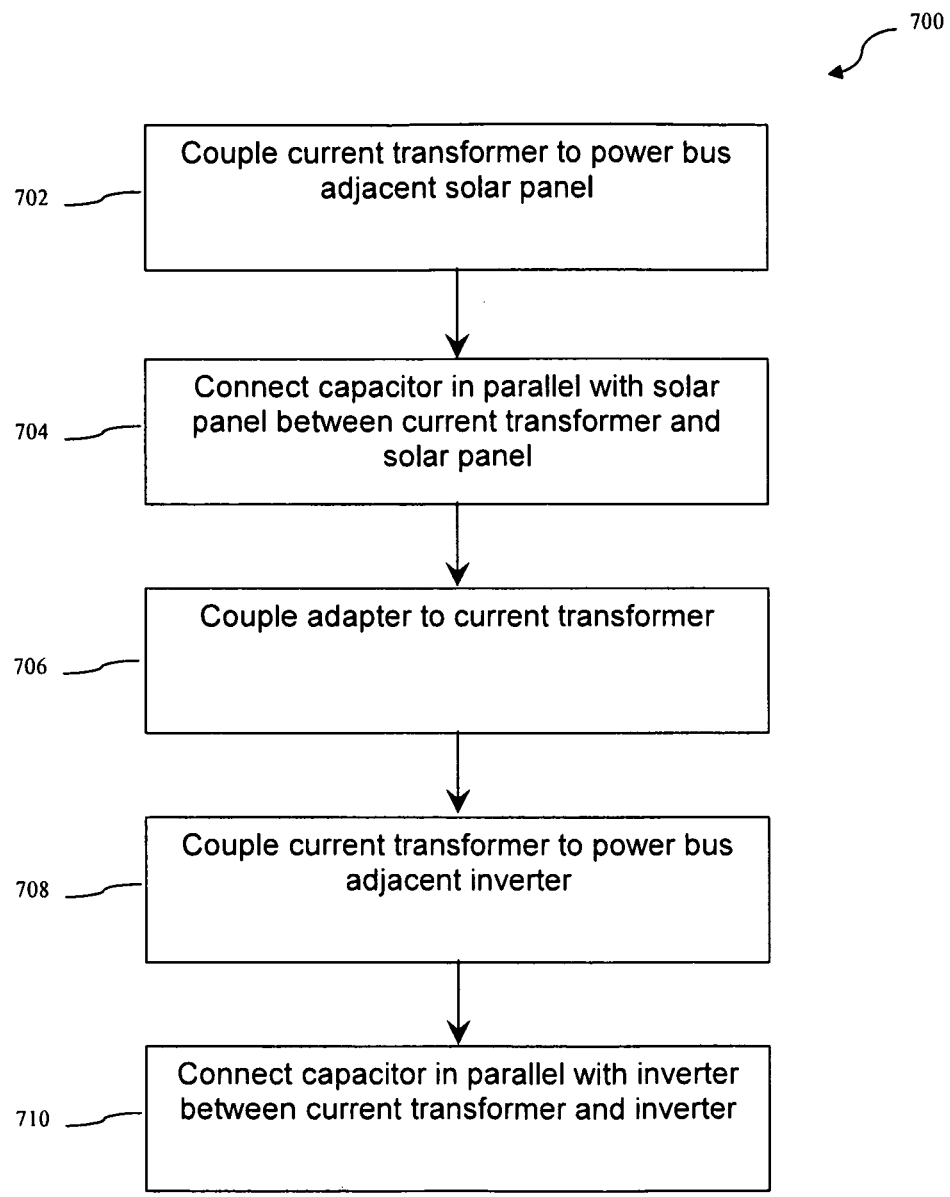
FIG. 6A is an exemplary method in accordance with one embodiment of the present invention.

FIG. 6A is an exemplary method 700 in accordance with one embodiment of the present invention. At a step 702, a current transformer is coupled to a power bus adjacent a solar panel. At step 704, a capacitor is connected in parallel with the solar panel and between the current transformer and the solar panel. At step 706, an adapter is coupled to the current transformer. At step 708, a current transformer is coupled to the power bus adjacent an inverter. At step 710, a capacitor is connected in parallel with the inverter and between the current transformer and the inverter.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution. For example, while the above discussion was focused primarily on the DC bus, the present invention can also be applied for a low frequency AC bus. As another example, while the coupling current transformers have been described to include a Rogowski coil, the coupling current transformers of the present invention can include variations of the Rogowski coil and transformers other than the Rogowski coil. As yet another example, while the discussion above sometimes refers to a source and other times refers to a load, the present invention can apply to both sources and loads, as appropriate.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations or steps in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A system comprising:
    a solar panel;
    a power bus, coupled to the solar panel, supporting transmission of AC communication signals, the power bus including a high current power wire;

a current transformer coupled to the high current power wire adjacent the solar panel, wherein the current transformer is operable to sense alternating current communication signals in a communication system monitoring solar panel performance; and a capacitor, coupled to the power bus, connected in parallel with the solar panel between the solar panel and the current transformer.

2. The system of claim 1 wherein the power bus is a DC power line.

3. The system of claim 1 wherein the current transformer includes the high current power wire as a primary winding and a Rogowski coil as a secondary winding.

4. The system of claim 3 wherein the current transformer has a winding ratio between 1:50 and 1:200 approximately.

5. The system of claim 3 further comprising an adapter communicatively coupled to the current transformer.

6. The system of claim 1 further comprising an adapter communicatively coupled to the current transformer.

7. The system of claim 6 wherein the adapter includes a modem.

8. The system of claim 7 wherein the adapter is configured to receive and transmit information from sensors, the information relating to measurements of photovoltaic cell characteristics.

9. The system of claim 1 wherein the power bus is a low frequency AC power line.

10. An energy generation system for supporting AC communication signals comprising:
an array of solar panels;
an inverter;
a power bus, connecting the array of solar panels and the inverter, to transmit the AC communication signals;
a plurality of capacitors;
a plurality of current transformers coupled to the power bus, wherein each solar panel in the array is associated with a corresponding capacitor of the plurality of capacitors and a corresponding current transformer of the plurality of current transformers, the corresponding capacitor connected in parallel with the solar panel;
a parallel capacitor connected along the power bus; and
a first current transformer positioned on one side of the parallel capacitor and a second current transformer positioned on the other side of the parallel capacitor forming a current transformer pair, and wherein secondary windings of each current transformer in the pair are connected to one another to form a separate path for the AC communication signals.

11. The system of claim 10 wherein the power bus is a DC power line.

12. The system of claim 10 wherein the corresponding current transformer includes a high current power wire as a primary winding and a Rogowski coil as a secondary winding.

13. The system of claim 12 wherein the corresponding current transformer has a winding ratio between 1:50 and 1:200 approximately.

14. The system of claim 12 further comprising a plurality of adapters, wherein each of the corresponding current transformers is coupled to a corresponding adapter of the plurality of adapters.

15. The system of claim 14 wherein the corresponding adapter includes a modem configured to process information from sensors, the information relating to measurements of photovoltaic cell characteristics.

16. The system of claim 10 wherein the corresponding capacitor is connected adjacent the solar panel and between the solar panel and the corresponding current transformer.

17. The system of claim 10 further comprising:
a capacitor connected in parallel with the inverter; and
a current transformer coupled to the power bus adjacent the inverter, the capacitor connected between the current transformer and the inverter.

18. An energy generation system for supporting AC communication signals comprising:
an array of solar panels;
an inverter;
a power bus, connecting the array of solar panels and the inverter, to transmit the AC communication signals;
a plurality of capacitors;
a plurality of current transformers coupled to the power bus, wherein each solar panel in the array is associated with a corresponding capacitor of the plurality of capacitors and a corresponding current transformer of the plurality of current transformers, the corresponding capacitor connected in parallel with the solar panel;
a parallel capacitor connected at a predetermined location along the power bus; and
a pair of current transformers, each current transformer of the pair positioned on each side of the parallel capacitor, secondary windings of the pair of current transformers connected to one another to form a separate path for the AC communication signals.

19. The system of claim 10 wherein a first portion of the array of solar panels are connected in series and a second portion of the array of solar panels are connected in series, the first portion and the second portion connected in parallel.

20. An solar energy system for supporting AC communication signals comprising:
at least one solar panel;
an inverter;
a DC power bus, connecting the at least one solar panel and the inverter, to transmit the AC communication signals, the power bus including a high current power wire;
at least one capacitor connected in parallel with the at least one solar panel;
at least one current transformer including the high current power wire as a primary winding and a Rogowski coil as a secondary winding, wherein the at least one capacitor is connected to the power bus adjacent the at least one solar panel and between the at least one solar panel and the at least one current transformer;
at least one adapter including a modem, coupled to leads of the current transformer, and configured to process information from sensors, the information relating to measurements of photovoltaic cell characteristics;
a separating capacitor connected in parallel with the inverter at a predetermined location along the power bus; and
a pair of current transformers, each current transformer of the pair positioned on each side of the separating capacitor, secondary windings of the pair of current transformers connected to one another to form a separate path for the AC communication signal.

* * * * *